(12) United States Patent
Whittington et al.

(10) Patent No.: US 11,568,422 B2
(45) Date of Patent: Jan. 31, 2023

(54) TRACKING METHOD FOR CONTAINERS HAVING REMOVABLE CLOSURES

(71) Applicant: Mississippi State University, Mississippi State, MS (US)

(72) Inventors: Wilburn Ray Whittington, Starkville, MS (US); Haitham El Kadiri, Mississippi State, MS (US)

(73) Assignee: Mississippi State University, Mississippi State, MS (US)

( * ) Notice: Subject to any disclaimer, the term of this patent is extended or adjusted under 35 U.S.C. 154(b) by 172 days.

(21) Appl. No.: 16/879,648

(22) Filed: May 20, 2020

(65) Prior Publication Data

US 2020/0342463 A1   Oct. 29, 2020

Related U.S. Application Data

(63) Continuation-in-part of application No. 16/042,694, filed on Jul. 23, 2018, now abandoned.
(Continued)

(51) Int. Cl.

| | |
|---|---|
| *G06Q 30/00* | (2012.01) |
| *G06F 16/53* | (2019.01) |
| *G06K 19/06* | (2006.01) |
| *G06K 19/07* | (2006.01) |
| *G06T 7/00* | (2017.01) |

(52) U.S. Cl.
CPC .......... *G06Q 30/018* (2013.01); *G06F 16/53* (2019.01); *G06K 19/06028* (2013.01); *G06K 19/06037* (2013.01); *G06K 19/0723* (2013.01); *G06T 7/001* (2013.01); *G06T 2207/30108* (2013.01)

(58) Field of Classification Search
CPC .................. G06Q 30/018; G06F 16/53; G06K 19/06028; G06K 19/06037; G06K 19/0723; G06K 19/086; G06T 7/001; G06T 2207/30108
See application file for complete search history.

(56) References Cited

U.S. PATENT DOCUMENTS

| | | | |
|---|---|---|---|
| 9,637,267 B2 * | 5/2017 | Ramsey | ............... B65D 17/401 |
| 11,126,808 B1 * | 9/2021 | Johnston | ............ G06K 7/10722 |

(Continued)

*Primary Examiner* — Thien M Le
*Assistant Examiner* — Asifa Habib
(74) *Attorney, Agent, or Firm* — Bradley Arant Boult Cummings LLP

(57) ABSTRACT

A method of tracking a container closure used to seal liquid in a container is provided, comprising applying a trackable indicia to a container closure, wherein the trackable indicia is unique to the container closure; recording an associated data set comprising a plurality of parameters related to the liquid in the container; correlating the associated data set with the trackable indicia; applying the container closure to the container to seal the liquid within the container; maintaining a database of the trackable indicia corresponding to the associated data set; and scanning the trackable indicia to retrieve the associated data set from the database. The method of the invention also includes utilization of a container closure having inherent natural imperfections and/or patterns on the top and/or sides of the closure and obtaining scanned images and data thereof which are analyzed and utilized for closure and container identification and likewise serve as scannable trackable indicia.

20 Claims, 14 Drawing Sheets

Related U.S. Application Data

(60) Provisional application No. 62/535,342, filed on Jul. 21, 2017.

(56) References Cited

U.S. PATENT DOCUMENTS

| | | | | |
|---|---|---|---|---|
| 2009/0245635 | A1* | 10/2009 | Yehezkel | G06V 30/413 382/171 |
| 2014/0291322 | A1* | 10/2014 | Ramsey | B65D 17/4012 413/18 |
| 2016/0009468 | A1* | 1/2016 | Rancien | B67B 5/036 53/410 |
| 2017/0361999 | A1* | 12/2017 | Lambrecht | B65D 41/0442 |

* cited by examiner (a)              (b)

(a)            (b)

TRACKING METHOD FOR CONTAINERS HAVING REMOVABLE CLOSURES

CROSS-REFERENCE TO RELATED APPLICATION

This application claims priority to and the benefit of and is a continuation-in-part of U.S. patent application Ser. No. 16/042,697, filed Jul. 23, 2018, and entitled "Improved Tracking Method for Containers Having Removable Closures", which claims priority to and the benefit of U.S. Provisional Patent Application Ser. No. 62/535,342 filed Jul. 21, 2017, and entitled "Improved Cork Tracking Method", which applications are hereby fully incorporated in their entireties by their reference herein.

FIELD OF THE INVENTION

The invention relates generally to devices and methods used to track containers having removable closures from filling to consumption, and more particularly to such devices and methods which allow recording, storage, and use of data related to unique indicia applied to closures or corks and/or use of data related to naturally-occurring scannable imperfection or pattern indicia of or on the closures or corks used to seal closures containing beverages, such as wine and similar products.

SUMMARY OF THE INVENTION

In a preferred embodiment, a method of tracking a container closure used to seal liquid in a container is provided, comprising applying a trackable indicia to a container closure, wherein the trackable indicia is unique to the container closure; recording an associated data set comprising a plurality of parameters related to the liquid in the container; correlating the associated data set with the trackable indicia; applying the container closure to the container to seal the liquid within the container; maintaining a database of the trackable indicia corresponding to the associated data set; and scanning the trackable indicia to retrieve the associated data set from the database.

In another embodiment, the method further comprises updating the associated data set by scanning the trackable indicia upon the occurrence of predetermined events, and recording information about the predetermined events to the associated data set, wherein the predetermined events may comprise one or more of the following: transfer of possession of the container, removal of the container closure from the container, and consumption of the liquid.

In another embodiment, the plurality of parameters may comprise one or more of the following: liquid production data, qualities of the liquid, conditions present during filling of the container, conditions during aging of the liquid, and geographic data during movement of the container over time.

In a more preferred embodiment, the trackable indicia comprises a scannable image on the container closure, where the scannable image is a graphic image, a bar code, a quick response (QR) code, or a unique series of alphanumeric characters.

Optionally, the trackable indicia comprises a radio frequency identification (RFID) tag attached to the container closure.

In an alternate embodiment, the trackable indicia comprises a scannable natural imperfection or pattern unique to the container closure or to the material used to construct the container closure.

In a more preferred embodiment, the container closure may comprise a natural cork, a synthetic cork, or a screw-type cap, and the liquid may comprise an alcoholic beverage, such as wine.

The method may also include the step of scanning using a mobile device wirelessly connected to a global information network, such as the Internet.

In another alternate embodiment, the container closure includes a sensing device within the container closure adapted to detect one or more parameters related to the liquid in the container, and further includes a memory adapted to store parameter data, wherein the parameters related to the liquid are one or more of the following liquid conditions: age, internal pressure, temperature, oxygen and carbon dioxide levels, and acid concentration.

In a further embodiment, the parameter data stored in the memory is transmitted wirelessly to a mobile device and added to the associated data set.

The above and other objects and features of the present invention will become apparent from the drawings, the description given herein, and the appended claims.

BACKGROUND OF THE INVENTION

There is a critical need for establishing multilateral communication between producers, distributors, retailers and consumers of wine and its bottling and sealing components. Cork, bottle, and wine producers, distributors, and retailers as well as wine consumers should have direct communication with one another to share data regarding a myriad of information related to the wine authenticity, quality, age, evolution, value, price, location, as well as information about the consumer, such as age, ethnicity, location, user profile and social characteristics.

Cork producers, wine producers, bottling producers, and their associated distributors currently have their own databases, profiles, and other information related to their aspects of the final wine product sold at a retailer. Still, consumers of wine have their own social profile information databases that are particular to them. Finally, retailers of wine have their own databases of their inventory, sales, and local consumers. However, the retailer is currently the primary entity which enjoys direct communication with the consumer at the time of sale, with the exception being consumers purchasing wine directly from a winery via a tasting room. The other entities related to the wine value chain would also like to have direct communication with the consumer at the time of sale.

During the lifecycle of a wine bottle, including bottling, packaging, shipping, storage, and purchase, all of the entities related to a bottle's lifecycle would be interested in continued updating of information from each other entity so that they can make the most informed decisions on the aspect of the value chain related to their expertise. For instance, a retailer would like to inform a wine distributor of their peak sales days, hours, and consumer profiles. Also, a wine distributor would like to inform a wine producer of changes in the wine characteristics (aging or maturation), real-time geographical sales information, and other critical data. Likewise, consumers would like to know more about the wines and other beverages they purchase and consume. There is also a desire to ensure authenticity of beverages, such as wines, champagnes, and other liquids, such that a consumer can be certain that the wine in the bottle is the actual wine of the producer on the label. In addition to those concerns, there is a need to trace the wine bottle's path through the market during its life cycle.

While the following description may refer to wine in many instances, the present invention applies to any liquid contained in a container, consumable or otherwise, where it is important to track details about the liquid in the container. Similarly, although the following description may refer to corks as one type of container closure, particularly those used to seal wine bottles, the present invention more broadly relates to any form of removable closure that is used to seal the container, including those closures having scannable naturally-occurring imperfections and/or patterns. With specific reference to wines, one way of establishing this system is to provide a means of tracking a cork used in the bottle which contains the wine. Because the cork always accompanies the wine contained in the bottle, from the bottling until the cork is removed, it is a convenient platform on which to base such a tracking method as described below.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by any appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

As will be further described below with respect to the preferred embodiment, the present invention is a method of tracking a container closure used to seal liquid in a container. Generally, the method comprises the following steps: (a) applying a trackable indicia to a container closure, wherein the trackable indicia is unique to the container closure; (b) recording an associated data set comprising a plurality of parameters related to the liquid in the container; (c) correlating the associated data set with the trackable indicia; (d) applying the container closure to the container to seal the liquid within the container; (e) maintaining a database of the trackable indicia corresponding to the associated data set; and (f) scanning the trackable indicia to retrieve the associated data set from the database.

Figure 1:
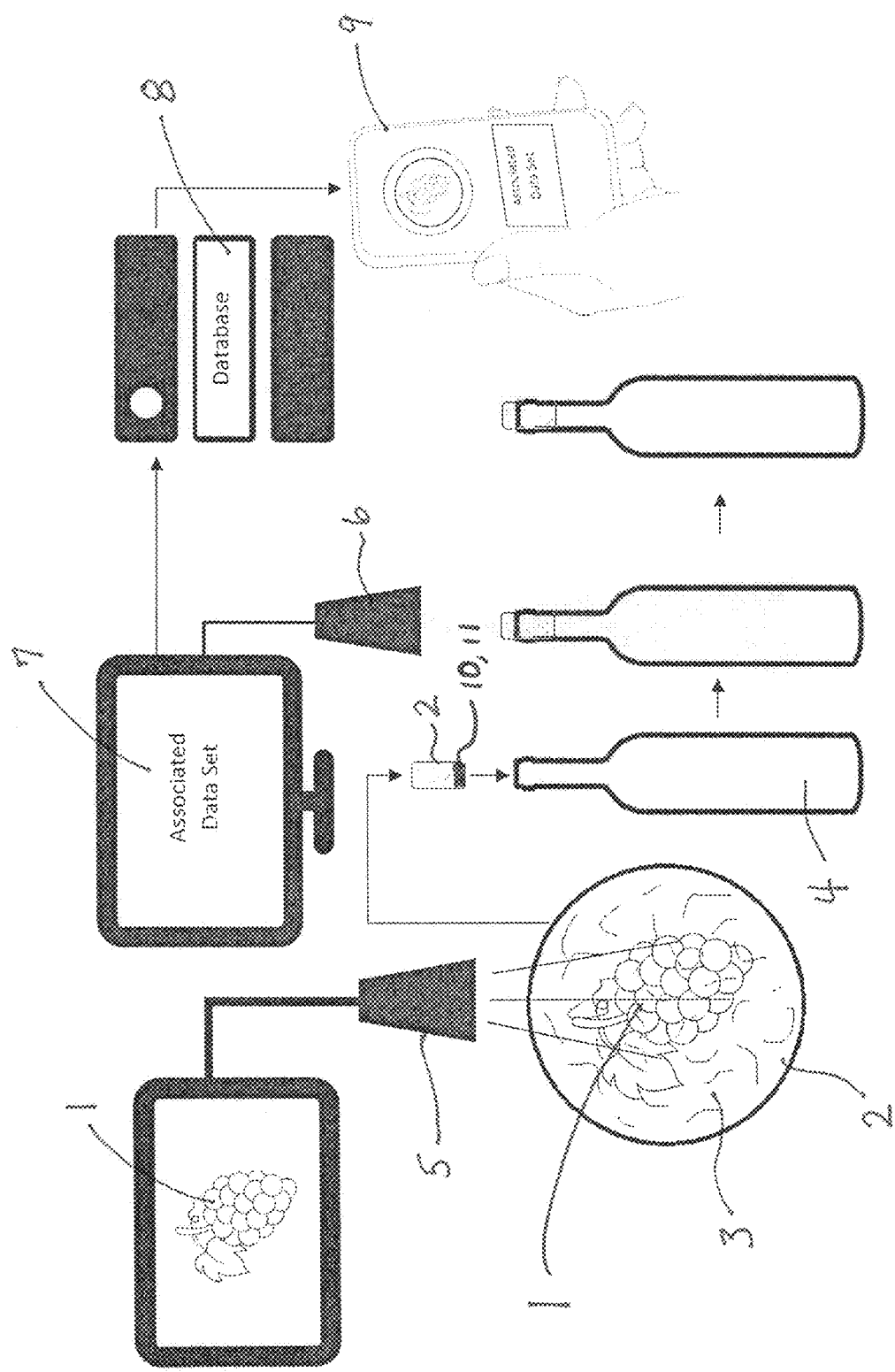
FIG. 1 illustrates a schematic view of a preferred embodiment of the present invention in the form of a method of tracking a container closure.

A schematic diagram of an environment in which the invention can be practiced is shown in a preferred embodiment in FIG. 1, which is directed specifically to the use of corks as container closures for sealing wine bottles. In this embodiment, an image 1 is applied to a closure or cork 2 by a laser etching device 5 or similar means to produce a trackable indicia 3 on the cork 2. The indicia 3 is preferably placed on the cork 2 by the cork manufacturer, so that large batches of corks 2 can be provided to the winery for bottling. However, the indicia 3 may also be applied at any time prior to insertion of the cork 2 into the bottle 4. If the indicia 3 is placed on top of the cork 2, the indicia 3 can be readable until and unless it is obscured by other closure materials used to cover the cork 2. For example, wine bottles often contain a plastic or metal wrapping that covers the cork 2. Alternatively, if the indicia 3 is placed on the side of the cork 2, the indicia 3 can be readable immediately prior to its insertion into the bottle 4 with which it will be associated. As further explained below, it is also possible for the indicia 3 to be readable after the cork 2 has been inserted into the bottle 4 through an exposed and transparent area of the bottle 4 itself.

Figure 2:
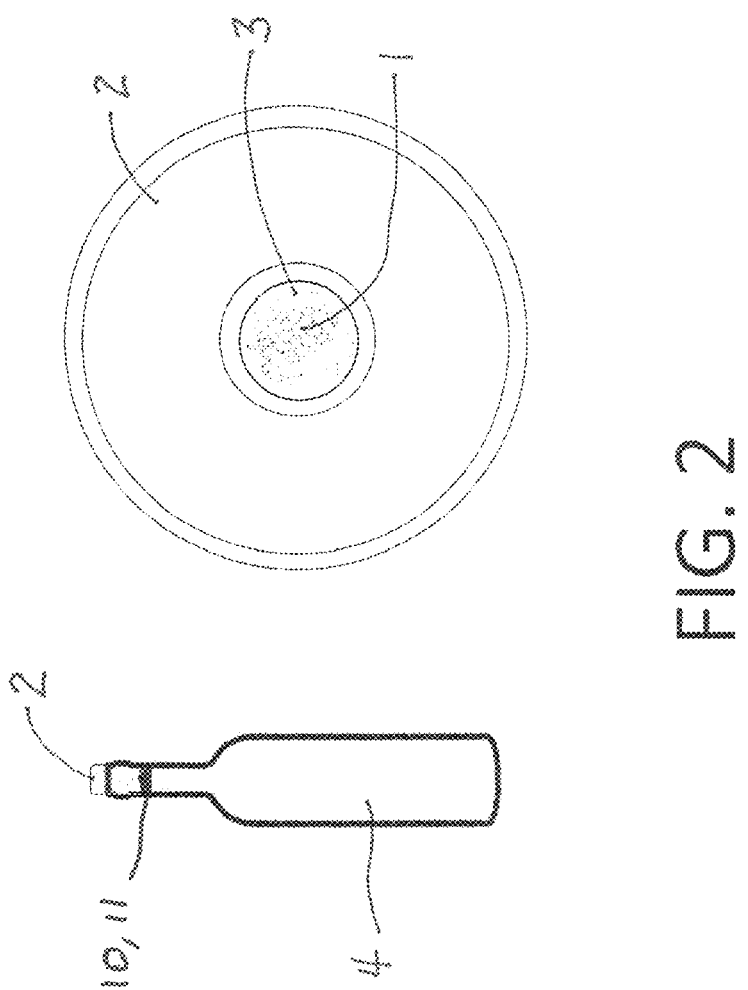
FIG. 2 is a view of a container closure applied to seal a container and having a tracking indicia applied to the closure.

Trackable indicia 3 may also be naturally-occurring scannable imperfections and/or patterns that are inherent feature(s) of the closure or cork located on the top and/or sides of the closure or cork. Likewise, such features can be scanned and/or obtained and relevant data placed in a database for storage, retrieval, and comparison with other data. Such features can be scanned and/or obtained prior to the closure or cork being installed in the container, while installed in the container if not visually obscured, and/or subsequent to removal from the container. FIG. 2 shows an embodiment whereby the trackable indicia 3 comprises a scannable image 1 on the cork 2.

Figure 3:
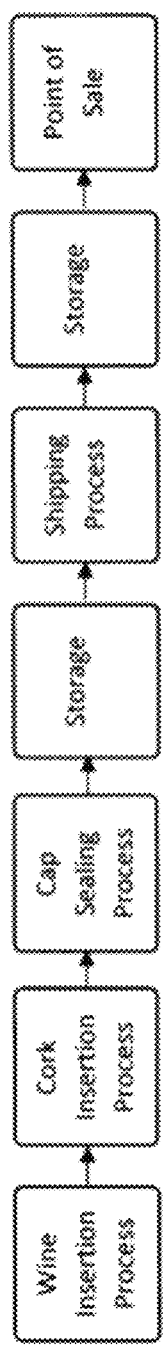
FIG. 3 is a view of a flowchart depicting various events during the life cycle of the container.

Depending on where the indicia 3 is placed or on where it is naturally located on the cork 2, the trackable indicia 3 can be detected and read by a camera 6 or other scanning or reading device either before or after the cork 2 is inserted into the bottle 4. The indicia 3 is linked to an associated data set 7 and becomes part of a database 8 whose data can be updated during the lifecycle of the bottle 4, such as by mobile scanning devices 9. Typical events in the lifecycle of a bottle 4 may be those events depicted in FIG. 3, although it should be understood that a wide range of variations in such events may be applicable to any particular bottle, without departing the applicability of the present invention.

It should be understood that any reference to "liquid" could be any consumable liquid, but particularly alcoholic beverages such as wine, champagne, beer, distilled spirits, and many other variants. Therefore, any reference herein to wine, corks, and related aspects of distribution, handling, storage, and sale are made solely for the purpose of describing and illustrating the present invention for that specific product, and it should be understood that the invention can be applied with equal effectiveness to many other alternative liquids which are sealed within their respective containers by a closure device. Moreover, there are numerous other consumable and non-consumable liquid products for which a consumer may wish to ascertain similar information stored in an associated data set 7.

With respect to the trackable indicia, in one embodiment, the trackable indicia 3 comprises a scannable image 1 on the cork 2, such as a bar code, quick response (QR) code, sequence of alphanumeric characters, naturally-occurring imperfections or patterns inherent in the closure or cork, or other graphic image as shown in FIG. 2. In another embodiment, the trackable indicia may comprise a radio frequency identification (RFID) tag attached to the cork or embedded within the cork. In still another embodiment, the trackable indicia may as described above comprise a scannable pattern unique to the material used to construct the cork 2. For example, in the case of natural corks, the unique pattern of cork material on the cork 2 itself, including any natural imperfections, random characteristics, or patterns, may be employed as a type of "fingerprint" of that particular cork. Thus, the "fingerprint" of the specific cork 2 can be made to correspond to a unique identifying code which is correlated to the associated data set 7.

With respect to the trackable indicia 3, another embodiment of the trackable indicia 3 may comprise a scannable image on the cork 2 that is encrypted with a watermark which is invisible by human observation, and is only observable to a scanner or imaging device 6 with an approved encryption key. In this indicia 3, the observable image can be any image such as a wine brand logo or manufacturer name. The hidden image may include imperfections in the observable image, such as intentional calculated unique imperfections in the observable image printing process, or natural imperfections in the cork 2 itself that alter the observable image in some unique way. The composite image 1, both the hidden and observable image, can be read by an imaging device 6, such as a smart phone or other image scanner, and an approved encryption key is used to remove the observable image from the composite image in order to read the hidden image. The hidden image provides the unique access code for the cork, wine, and all other data stored in the associated data set 7 for the wine and its path through the value chain.

In the specific case of wine provided in bottles, and as indicated earlier herein, the trackable indicia 3 may be placed anywhere on the cork 2 that enables the indicia 3 to be perceived by the scanning device 6. For example, the indicia 3 may be placed on the side of the cork 2, such that it remains hidden until the cork 2 is removed from the bottle 4. Upon removal of the cork 2, the indicia 3 can then be scanned. Alternatively, if the cork 2 is used to seal a glass wine bottle 4 that has sufficient transparency, the indicia 3 on the cork 2 may be perceived while the cork 2 is still in the bottle 4 through an exposed area on the glass bottle 4.

Regardless of the type of trackable indicia 3 employed with the present invention, all or part of the information in the associated data set 7 can be unlocked based on the authority or credentials of the specific user of the imaging or scanning device, or depending on which encryption key is held by the user.

In a preferred embodiment, the container closure may comprise a natural cork, a synthetic cork, or a screw-type cap. However, it will be understood that any form of closure used to contain the liquid in the bottle may be suitable, and still within the scope of the invention.

With regard to the associated data set 7, the data set may contain any and all information or parameters that may be relevant to the contents of the bottle and which may be desirable to trace. For example, in the case of a specific bottle of wine, a non-exhaustive list of the types of traceable information may be: (1) the cork manufacturing process, including the date of manufacturing, method of manufacturing, inspection quality, etc.; (2) the planting and harvesting details of the grapes, the wine manufacturing process, including barrel information, bottling date, type of wine and its characteristics, and the authenticity of the wine; and (3) case shipment information, including destination, date of packaging, and country of origin. The parameters may also include the conditions at bottling, conditions during maturation (aging), location of bottling, and geographic location of the bottle during movement throughout its life cycle. All such digital data in the associated data set 7 can be stored in an appropriate manner on a suitable computer system or cloud storage for retrieval and/or updating as the circumstances arise.

Figure 4:
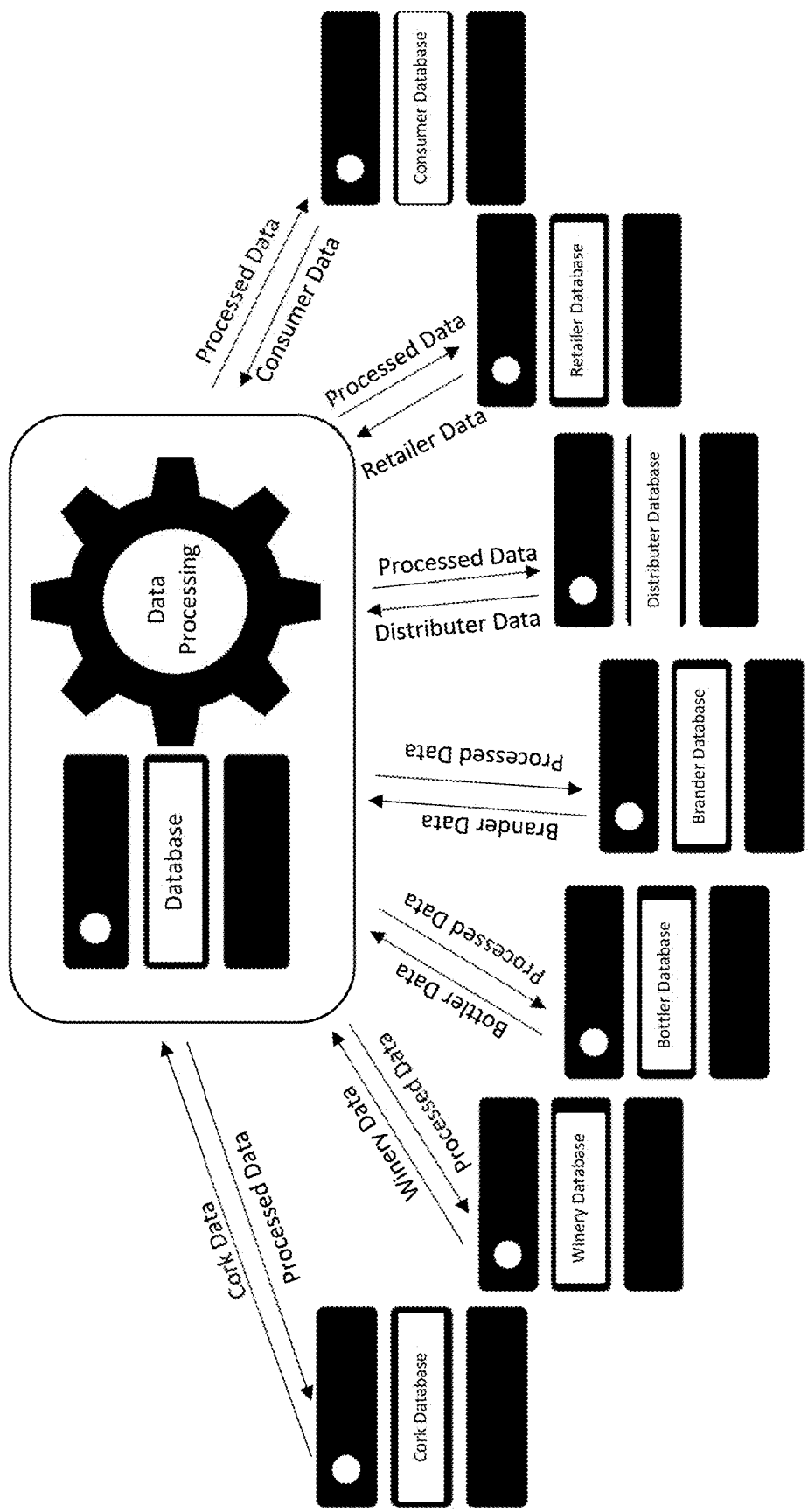
FIG. 4 is a schematic view of data flow in a preferred embodiment of the invention.
Figure 5:
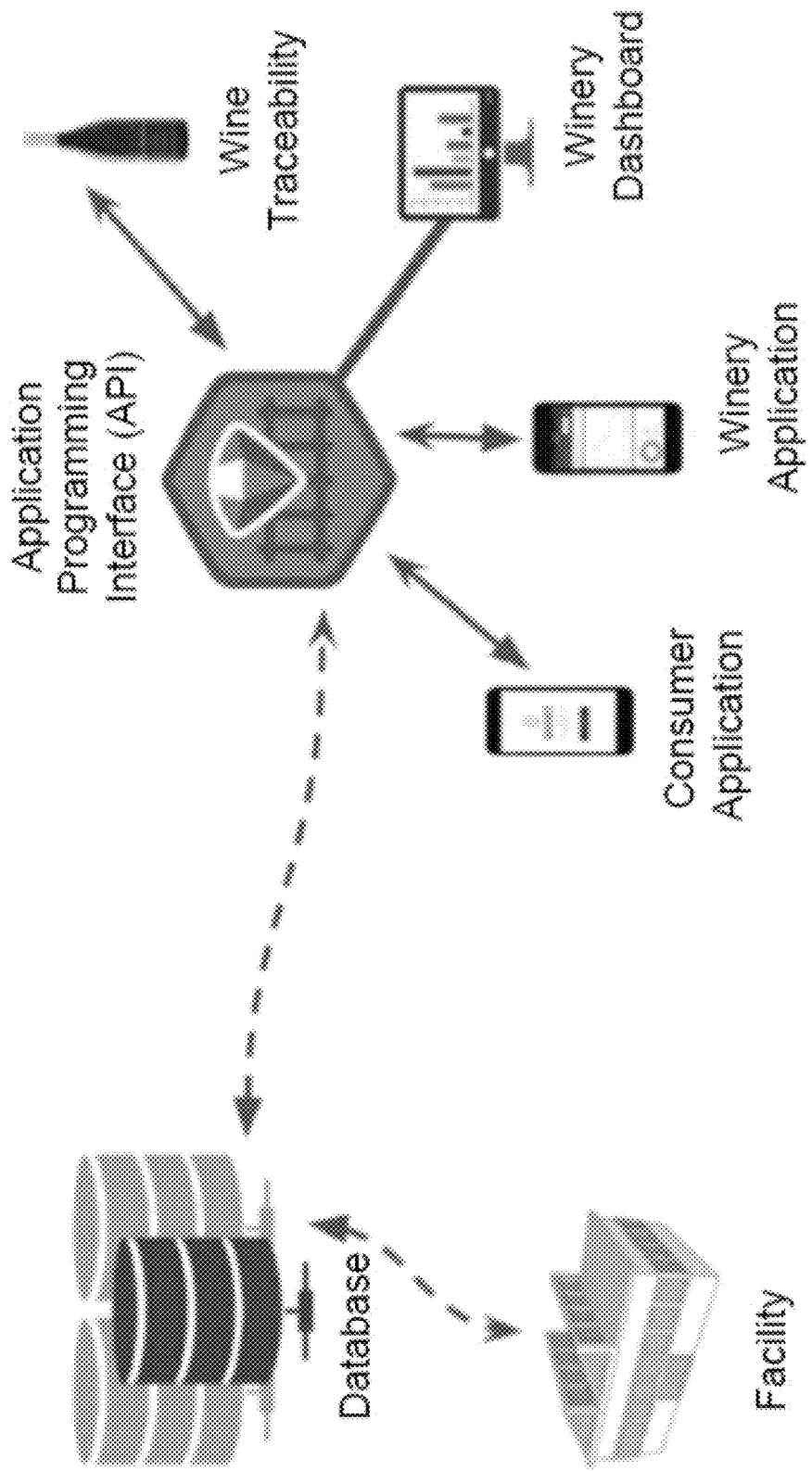
FIG. 5 is an alternative schematic view of interactions between an application programming interface (API) and various computing devices for exchanging data related to the container.

Once the associated data set 7 for a particular bottle of wine is created and stored, it can be digitally correlated to a specific tracking indicia 3 for the cork 2 in that specific bottle 4. Thus, a database 8 can be created and maintained to allow one-to-one correspondence between the tracking indicia 3 and the associated data set 7. This database 8 is accessed upon a scan of the tracking indicia 3. The database 8 can be stored on a suitable computer system at any location, such as a remote server or cloud storage, which is connected to a global information network, such as the Internet. FIG. 4 shows a schematic view of data flow in a preferred embodiment of the invention, specifically multiple databases and data flow to and from those databases. FIG. 5 shows an alternative schematic view of interactions between an application programming interface (API) and various computing devices and data sources for exchanging data related to the container.

The scanning is preferably performed using a mobile device 9 wirelessly connected to the Internet. For example, a consumer or anyone interested in the bottle of wine, should be able to scan the indicia 3 with the camera features or other scanning technology that reside on a smart phone 9. As the smart phone 9 is typically connected to the Internet, via a cellular or wireless communication protocol, data received from the scanned indicia 3 can be sent to the database 8 for retrieval of the associated data set 7 that corresponds to that particular indicia 3. Of course, depending on the authentication credentials of the user, only certain types of data access from the database 8 may be permissible.

The method may further comprise the step of updating the associated data set 7 by scanning the trackable indicia 3 upon the occurrence of predetermined events, and recording information about the predetermined events to the associated data set 7. By way of example, the predetermined events may comprise one or more of the following: transfer of possession of the bottle 4, removal of the cork 2 from the bottle 4, and consumption of the wine. Rare or expensive bottles of wine are often bought and sold several times before they are consumed, and a buyer may find it useful to know details about the persons in possession of the bottle 4 since the first sale, or perhaps the conditions in which the bottle 4 was kept.

It is also within the scope of the present invention to include a sensing device 10 within the cork 2 to detect various conditions related to the bottle of wine. For example, some of the many parameters that might be sensed and tracked are age, internal pressure, temperature, oxygen and carbon dioxide levels, and acid concentrations. Suitable transducers which sense these parameters can record data associated with those values and store them in memory 11 located adjacent to the sensing device 10, and such parameter data can be transmitted wirelessly through an included communication device (including RFID or similar technology) as explained above and incorporated into the associated data set 7.

With the above features of the present invention in mind, the commercial implementation of the tracking indicia 3 and the database 8 can include a smartphone application available to consumers, as well as a business-focused software interface for wineries that significant enhance the effectiveness and utility of the process. Each of these additional components would be in communication with the database 8 and are described further below.

With respect to the smartphone application installed on a mobile device 9, a consumer will typically shop at a wine retailer, and he will view the wines available for purchase on the retailer's shelves. The consumer can use the app, in conjunction with the camera and scanning features of the device 9, to scan wine bottle labels to receive limited but unique information about the wine to make a purchase decision. Also, if the trackable indicia 3 is exposed to the consumer, as explained above, the consumer would be able to access additional information about that specific bottle. The data received from the database 8 and the associated data set 7 may include the wine brand, consumer ratings, and winery rewards. If the trackable indicia 3 is not exposed to the consumer until after the cork is removed, then after removing the cork 2 and opening the wine bottle, a scan of the trackable indicia 3 on the cork 2 can now allow the consumer to view the story of the wine and its unique taste and related qualities. Furthermore, the consumer can collect rewards, input their personal information, rate their wine, enhance their social status in the wine world by integrations with social media platforms, and communicate with the winery.

With respect to the software interface for wineries, sometimes referred to as a "dashboard", the data generated from grape-to-glass, including consumer information uploaded during the wine lifecycle, provides the winery with a wealth of valuable information on the product and consumer characteristics. This additional data becomes a part of the database 8 and the associated data set 7 and is curated and presented to the winery in the form of trends, demographics, social statistics, growth opportunities, competitive advantages, and any other data useful to the winery. The wineries can then use this information to make more strategic distribution and branding decisions as well as create direct-to-consumer advertising and incentives.

For the invention, the method includes methodology to track a container closure. The trackable indicia 3 is unique to the container closure and may comprise a scannable pattern unique to the material used to construct the cork or container closure of the invention or may be naturally-occurring and inherent therein. Moreover, the unique scannable pattern may be based on natural imperfections of the cork or material used to construct the container closure. This allows the unique scannable material pattern to be used as an identifier or 'fingerprint' for scanning and/or tracking or may include natural imperfections in the cork or closure itself. The invention uses the natural unique and/or already-existing inherent imperfections of or in the container closure material to authenticate, track, and/or identify a specific container. Use of additional indicia is optional, so that no additional application of any type of indicia to the material is necessary when utilizing these natural imperfections.

For example, images can be taken of any side and/or the top of a closure or cork stopper, where the top and/or side is visible and is not covered or obscured by the container, label, and the like, with a smart phone camera, for example, and image analyses can be done for image recognition. Scanning and/or images can be obtained prior to the closure being applied to the container, while the closure is installed or within the container, after the closure is removed from the container, or a combination thereof. The images can be obtained from any side or the top of the closure to obtain the grey-scale image(s) of the closure imperfections or patterns. The image recognition process of the invention results in exacting recognition of a specific closure or cork stopper. In addition, the invention accounts for conditions whereby the closure is altered as it undergoes being squeezed in the container or bottle and as it gets altered and/or liquid-absorbed or dirty inside the container or bottle by the fluid, or wine, maturation process, for example. The image analysis software recognizes that closure or cork as the same closure or cork before the alteration(s). Such analyses can be focused on characteristics including the location of the closure pore pattern center of gravity, pore shape, and the like.

The method of the invention initially identifies a trackable indicia to a container closure. The process of identifying the indicia involves identifying the natural pattern and/or imperfections to create an indicia data. A particular pattern is captured by scanning and imaging, while the creation process is accomplished through particular developed software, which corresponds to a systematic computing process after the recurring process of identifying the pattern or imperfection for each individual enclosure. This process involves, for example, machine learning and image analyses. The trackable indicia can be located on the top of the closure, the side(s) of the closure, or a combination thereof.

The invention utilizes the natural imperfections by sophisticated image analyses (for example, using images taken by a smart phone camera or any camera) that may be software-based. The image analyses provide for unique and unequivocal recognition, identification, and tracking of a closure or cork stopper even after subsequent alteration(s) such as during the wine maturation process in the bottle, for example. The closure or cork has inherent characteristics and defects which basically consist of pores and the topology of those pores in a given closure or cork stopper is unique to each closure. As a result, such characteristics can be used as a fingerprint for closure and/or container identification purposes.

A closure such as cork inherently has imperfections. The invention utilizes a scannable pattern(s) based on the natural imperfections of the material of cork, for example. Such imperfections, i.e., light and/or dark colors, swirls, pores, etc. of the cork, for example, are used to identify the closure, and thus also the container, as described herein.

The invention provides a methodology and technique for scanning an image of the closure or cork and its imperfections and trackable indicia and translating that information to a unique indicia and index of the closure for information or data transmission of data set(s) to and from relevant databases. Scanning can be accomplished prior to applying the closure to a container, after the closure is removed from the container, while the closure is in or within the container, or a combination thereof. A camera, for example, can be used to scan the closure/cork prior to installation in the bottle and it or another device can be used to create a grey-scale image of the closure/cork or of the scanned image of the closure or specifically of the trackable indicia and natural imperfections and/or patterns of the closure/cork. The digital image of such visible natural material imperfections is stored or collected in a database for comparison to other image scans and grey-scale image scans of closures/corks before and after removal from the respective container or bottle, as well as for comparison while the closure is in the container, or a combination thereof, depending on the tracker or system user. Further, the method allows retrieving and/or transmitting the associated data set(s) from and/or to the database(s) to identify a closure and the plurality of parameters related to the liquid in the container and to provide a match of data to identify a closure and/or the plurality of parameters related to the liquid in the container.

At a subsequent time and/or place, a camera located within a phone or other device can be used to scan the closure/cork after removal from the container/bottle and create a new grey-scale image of the closure/cork. A digital image comparison and recognition technique, known as "digital image correlation", is utilized to compare the original closure/cork image prior to bottling to the subsequent or new closure/cork image after removal from the container/bottle. This method and technique allows for deformation and discoloration of the closure/cork to be quantified and removed from the analysis so that the basic unaltered, unique characteristics of the closure/cork can be compared for identification purposes. The invention utilizes digital image correlation mathematical techniques due to the fact that the closure/cork insertion into the container/bottle typically causes deformation of the closure/cork and the aging process of the container contents typically causes discoloration of the closure/cork. Once a match has been made between a stored image obtained prior to the bottling process and a subsequent newly-scanned stored image obtained after the opening of a bottle, then the information related to that specific container/bottle is available to be transferred from the producer, distributor, and/or retailer, for example, to the consumer, or vice-versa.

Methodology and Algorithm for Using Scannable Natural Patterns and Imperfections of Closures for Identifying and Tracking Removable Closures and their Containers The invention provides a straightforward methodology that uses the natural imperfections and patterns of closures/corks to identify and track the removable closure/cork of a container and thereby also track the container as well.

A. Introduction

A cork closure used for sealing a container typically exhibits and possesses unique and natural imperfections and patterns consisting of pores, for example, that can be efficiently used as an imaging-device readable label or 'fingerprint' to identify, track, and store information related to that closure and container. The invention utilizes these unique imperfections and patterns as a closure fingerprint to produce a unique index for each closure, or cork stopper for example, and to recognize the same closure from any database of indices representing any number of closures when the particular closure is subsequently scanned again by the same or another imaging device. Images can be obtained from a top view or side view of a closure, or a combination thereof. The method of natural imperfection pattern identification relies on machine learning tools and/or Fourier Mellin transforms.

The method of the invention identifies a unique trackable indicia to a container closure that comprises a scannable pattern unique to the closure itself. The identification of the indicia involves identifying the natural pattern/imperfections to create an indicia data. A particular pattern is captured by scanning and imaging, while the creation process is accomplished via particular software, which corresponds to a systematic computing process after the recurring process of identifying the pattern or imperfection for each particular enclosure. This process further involves, for example, machine learning and image analyses.

B. Obtaining a Unique Index (ID)

Figure 6:
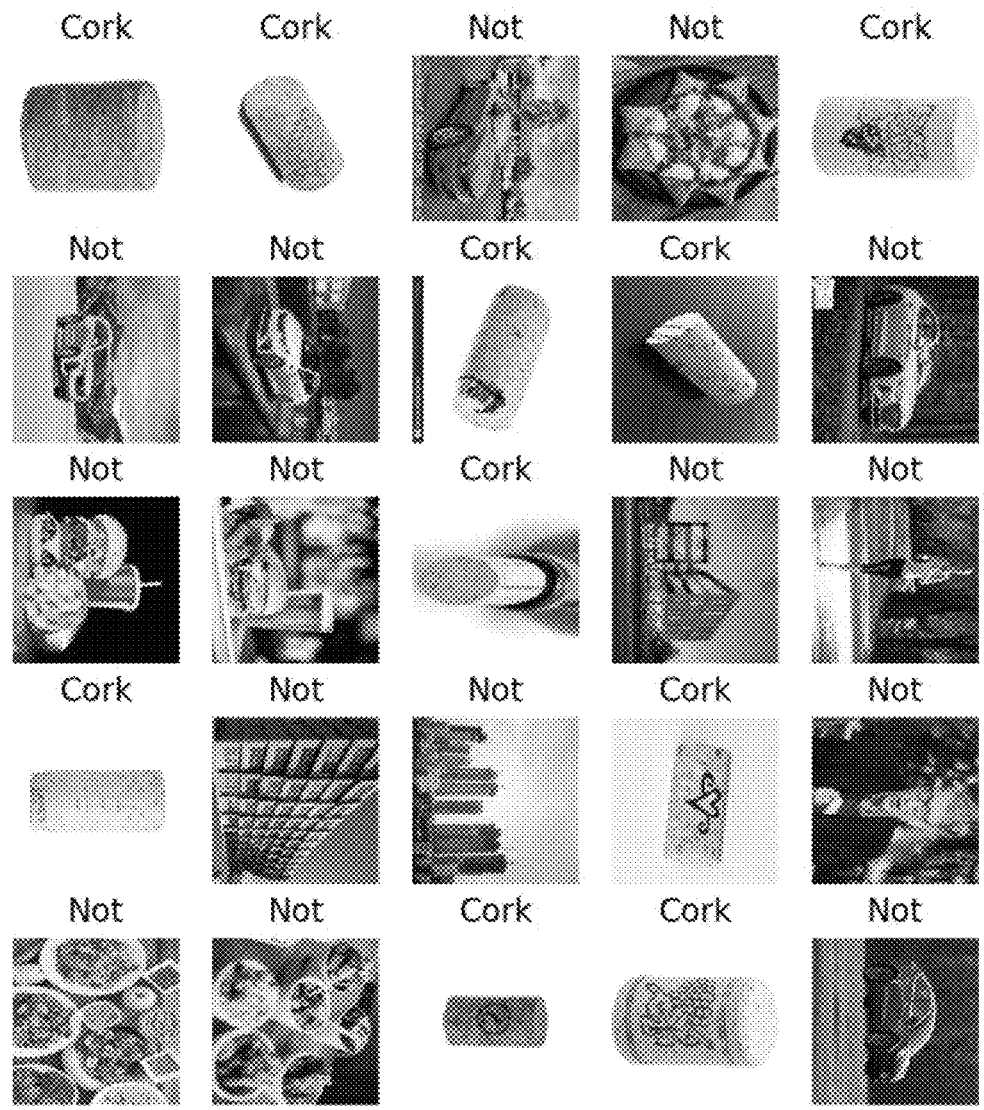
FIG. 6 is a pictorial representation of a Convolution Neural Network (CNN)-based machine learning technique to classify whether an image is a closure or cork-based closure, or not a closure or cork-based closure.

The invention provides for utilizing a scannable pattern unique to container closure material, where the pattern is based on natural imperfections of the material, to identify a unique index for a specific closure. The method is based on utilization of a computer-based or microprocessor-based device and/or algorithm or algorithm means, as follows:

(1) Determination by such a method and/or algorithm of whether or not an image contains a container closure and, specifically, a cork-based closure, followed by accurate recognition of the image portion corresponding to the closure or cork-based closure and elimination of any irrelevant information. FIG. 6 shows one example where such random-type images are categorized and determined to be cork-based closures or not cork-based closures. FIG. 6 shows use of a Convolution Neural Network (CNN)-based machine learning technique to classify whether an image is a closure or cork-based closure, or not a closure or cork-based closure.

Figure 7:
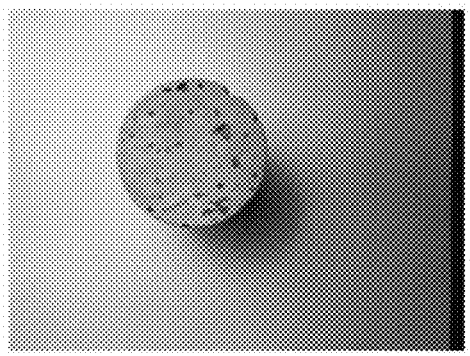
FIG. 7 is a pictorial representation of the method of the invention of manual insertion of the rectangular region containing a cork closure, specifically (a) the top view image of the cork closure obtained from a camera and (b) only the portion with or showing the closure which is cropped and is extracted to include only the cork.
Figure 7:
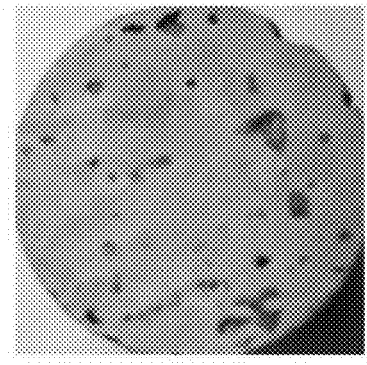

(2) An image processing tool, preferably a machine learning tool, is or can be used to segment the cork or closure portion of the selected image and extract required identification data. FIG. 7(a) shows the top view image of a cork closure obtained from a camera. FIG. 7(b) shows only the portion with or showing the closure which is cropped and relevant identification data is extracted from the scanned image to include only the cork. FIG. 7 shows the method of the invention of manual insertion or extraction of the rectangular region containing the cork closure. The insertion or extraction of the rectangular region may also be automatic.

Figure 8:
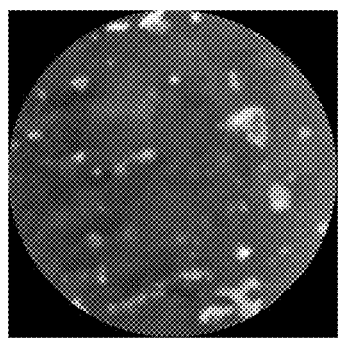
FIG. 8 is a pictorial representation of (a) a gray-scale image of a cork with removed background and (b) the gray-scale image of (a) with a threshold value of 2% to obtain and show only the distinct natural imperfections in the cork closure.
Figure 8:
Figure 9:
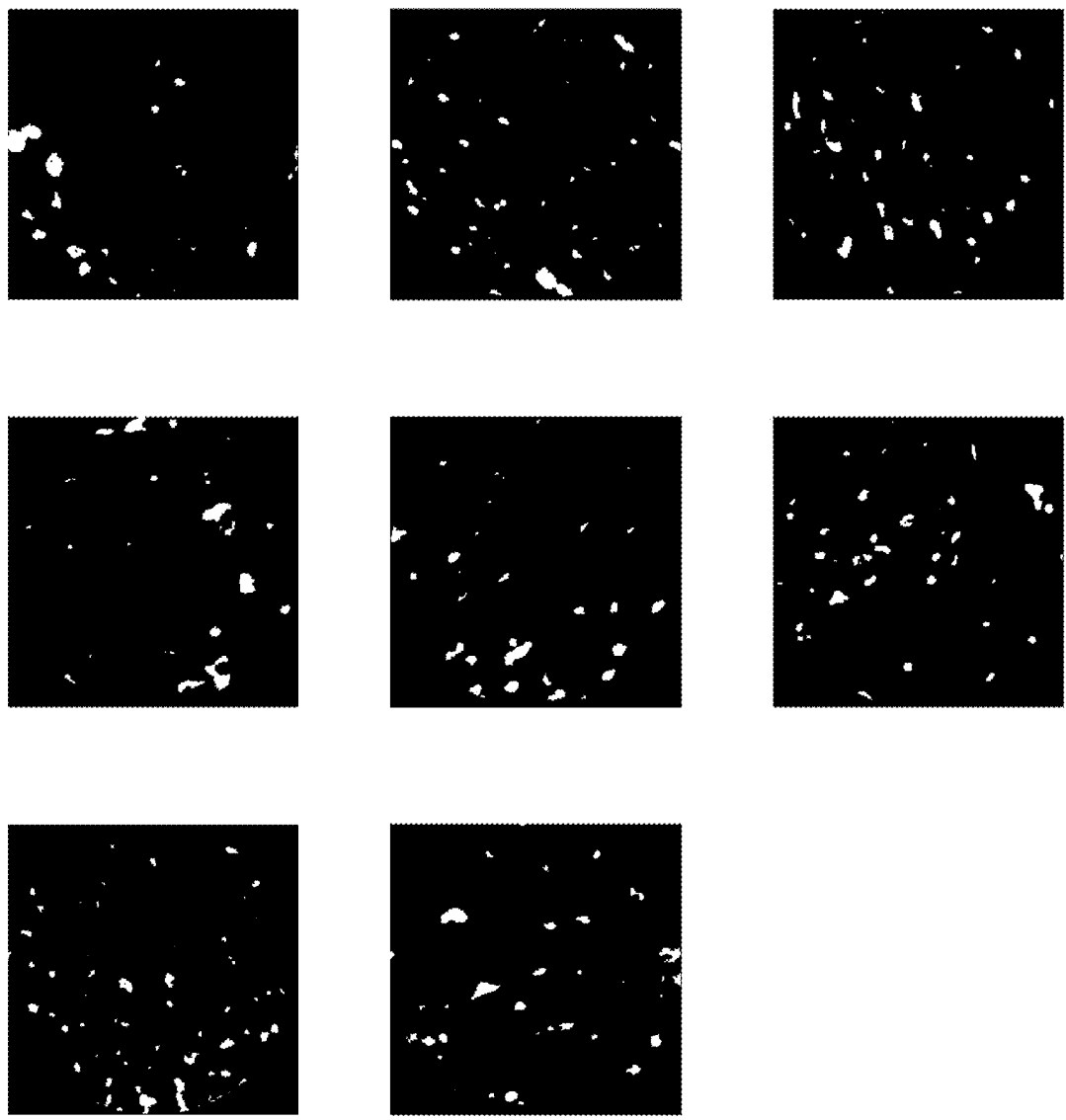
FIG. 9 is a pictorial representation of eight examples of gray-scale images of cork closures with removed backgrounds and with use of threshold value of 2% showing other example natural pattern imperfections of different cork closures.

(3) Any visible background, or as much as possible, is removed and the scanned image is converted to a grey-scale image. A threshold value is used to collect only the visible natural imperfections of the cork closure. FIG. 8(a) shows a gray-scale image of a cork with the background removed. FIG. 8(b) shows the gray-scale image of FIG. 8(a) with the use of a threshold value of 2% to obtain and show only the distinct natural imperfections in the cork closure. A threshold value (such as 2%) is the value which determines that enough black\white points (pixels) are available in the image (FIGS. 8 and 9) to distinguish the natural pattern of cork. This is the value used to acquire only the natural imperfection pattern(s) from the cork. FIG. 9 shows multiple examples of gray-scale images of cork closures with removed backgrounds and with use of threshold value of 2% showing other patterns made by different cork closures. FIG. 9 shows unique scannable natural pattern imperfections of eight (8) cork closure examples captured in black and white images. Different patterns of natural imperfections serve as a unique index for each cork closure. These differences in patterns provide the database platform to determine a unique index for each particular cork closure. Further, the method includes recording at least one associated data set of a plurality of parameters related to the container and/or its contents, the grey-scale image(s) of the trackable indicia 3, and visible natural imperfections of the closure. The database platform includes maintenance of a database of the trackable indicia 3 that corresponds to the associated data set.

(4) A Fourier Mellin Transform of the image is performed and the results obtained to produce a rotation invariant feature of the selected image. A cropped image with a size of about 256×256 pixels, for example, can be reduced to about 16×256 pixels, for example, in Fourier space as the final image.

C. Comparing and Identifying the Index from the Database

When another image of the same closure/cork is taken and obtained, the method and system of the invention and algorithm steps create an index for that particular closure/cork and determines the existence or absence in the existing database of index data for that closure/cork, regardless of the conditions in or by which the image was taken or obtained.

The invention compares the data of the grey-scale image of the trackable indicia, the index and index data of the closure, and the data of the visible natural imperfections of the material to other data of grey-scale images, indices, and visible natural imperfections of the material of other closures in the database and retrieves and/or transmits the associated data set(s) from and/or to the database(s) to identify a specific closure and a plurality of parameters that are related to the container and/or the contents of the container. Further, the invention provides a match of data, when one occurs, to identify a closure and/or the plurality of parameters related to the contents of the container.

Figure 10:
FIG. 10 is a pictorial representation of data as observed in Fourier space.
Figure 11A:
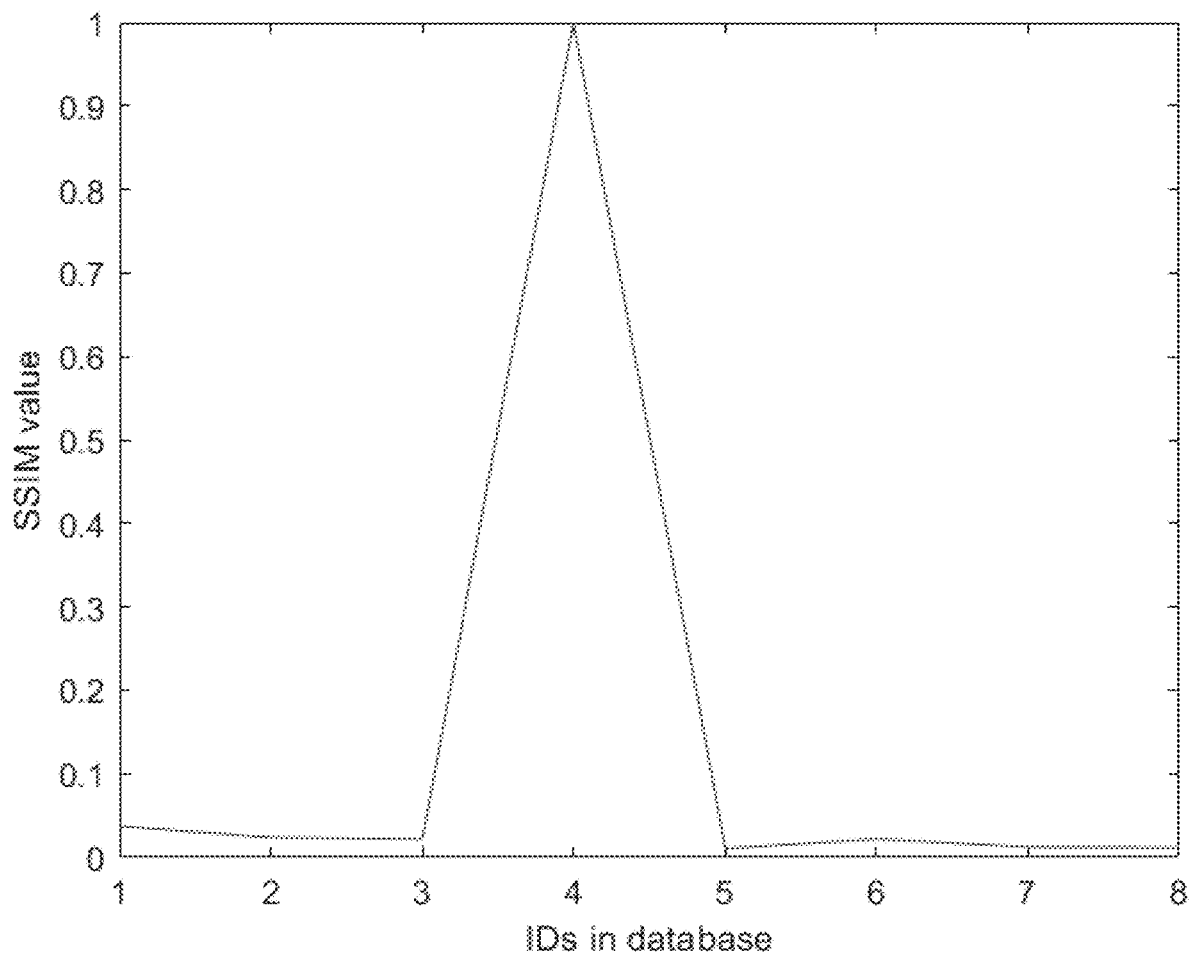
FIG. 11A is a graphical representation of the comparison profiles of input ID with unique IDs in a database using SSIM during one test comparison of input ID to unique IDs in a database.
Figure 11B:
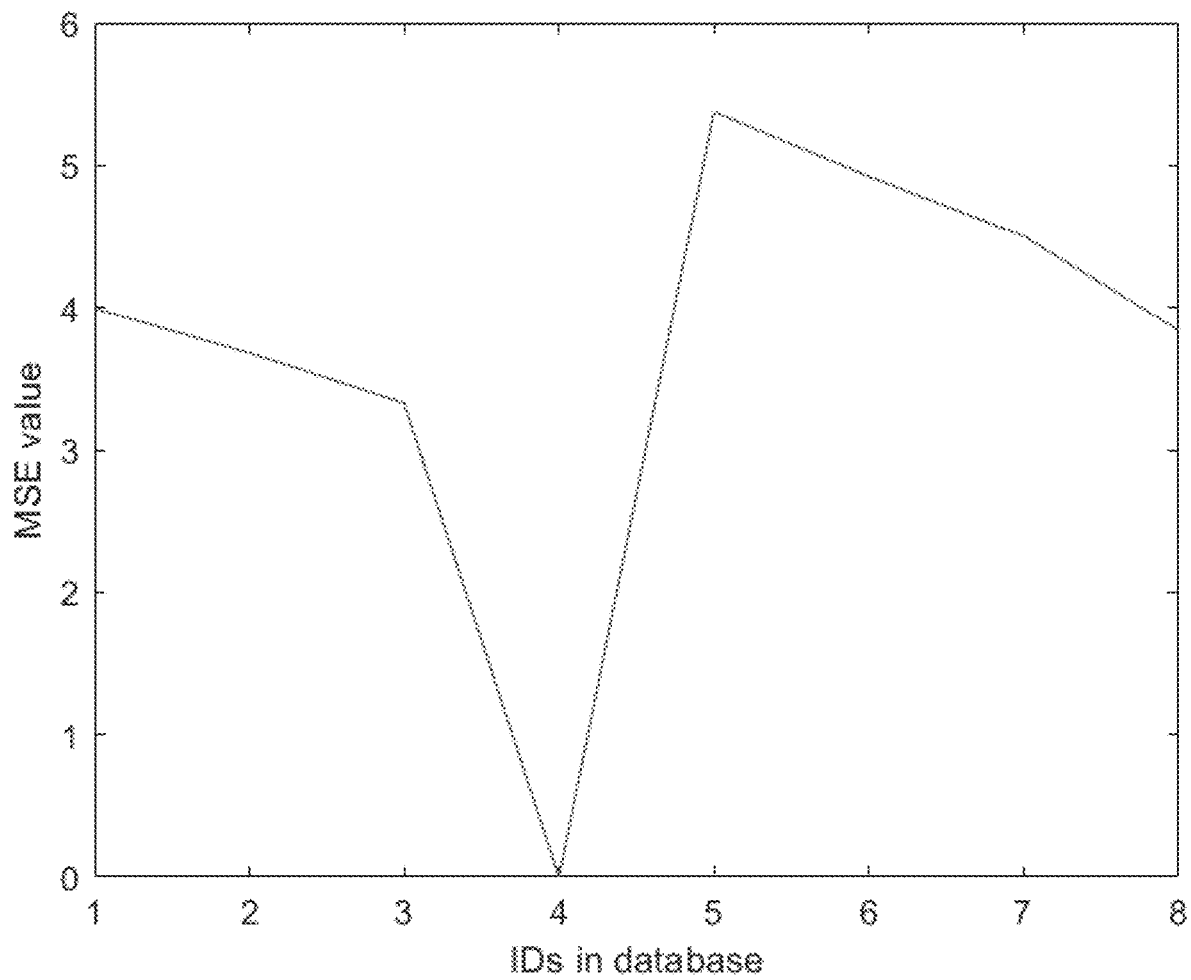
FIG. 11B is a graphical representation of the comparison profiles of input ID with unique IDs in a database using MSE during one test comparison of input ID to unique IDs in a database.

The system and method of the invention and algorithm steps described herein can be implemented by or performed by at least one computer and/or at least one microprocessor-based device or hardware and software, non-transitory computer-readable media, or a combination thereof. Further, the method may be implemented or performed in whole or in part by a mobile device wirelessly connected to a global information network. The invention also involves the steps of:

a. Obtaining an index for the closure/cork using the methods described above in obtaining a unique index ((B)); and
b. Comparing the index with each database using either a structural similarity index method (SSIM) or a mean squared error (MSE) method. SSIM compares the perceived quality of images to find similarity between them in which an SSIM value of 1 represents most similar images, whereas an SSIM value of 0 shows that the images compared have no similarity. MSE performs a simple mean square of differences in pixel values of two images to get an MSE value. MSE value of 0 means identical images, while MSE value greater than 0 indicates the dissimilarity of the images. Fourier Mellin transforms allow the comparison of index data for angle of rotation, for example. This rotation angle is first used to shift the index data in Fourier space and then to compare for SSIM and/or MSE values. FIG. 10 shows data as observed in Fourier space. The natural imperfection of cork in real space is converted to frequency domain in Fourier space, thus categorizing the most significant imperfections in the Fourier space. The most significant imperfections are distinguished as a pattern of bright regions along the x-axis of Fourier space. FIGS. 11A and 11B show the profile of SSIM and MSE values, respectively, during one test comparison of input ID to unique IDs in a database. FIG. 11A shows comparison profiles of input ID with unique IDs in a database using SSIM, and FIG. 11B shows the comparison profiles using MSE. FIG. 11A shows the structural similarity index of the images in Fourier spaces for ID 4 compared with unique IDs in the database. As seen in the Figure, an SSIM value closer to 1 means that the current pattern of natural imperfection shows more similarity to the pattern it is compared to, whereas an SSIM value of 0 shows that the images compared have no similarity. The Figure shows how the value for correct ID is exactly one as compared to other unique IDs in the database. Similarly, FIG. 11B shows mean squared error for two images in Fourier space. Since this uses simple pixel-by-pixel comparison to calculate the error, an MSE value of 0 means that the pictures or images are similar. The higher the value of MSE, the more dissimilar are the images. Since the MSE value is 0 for ID 4, this signifies that the input ID is identical to ID 4 from the database.

Figure 12A:
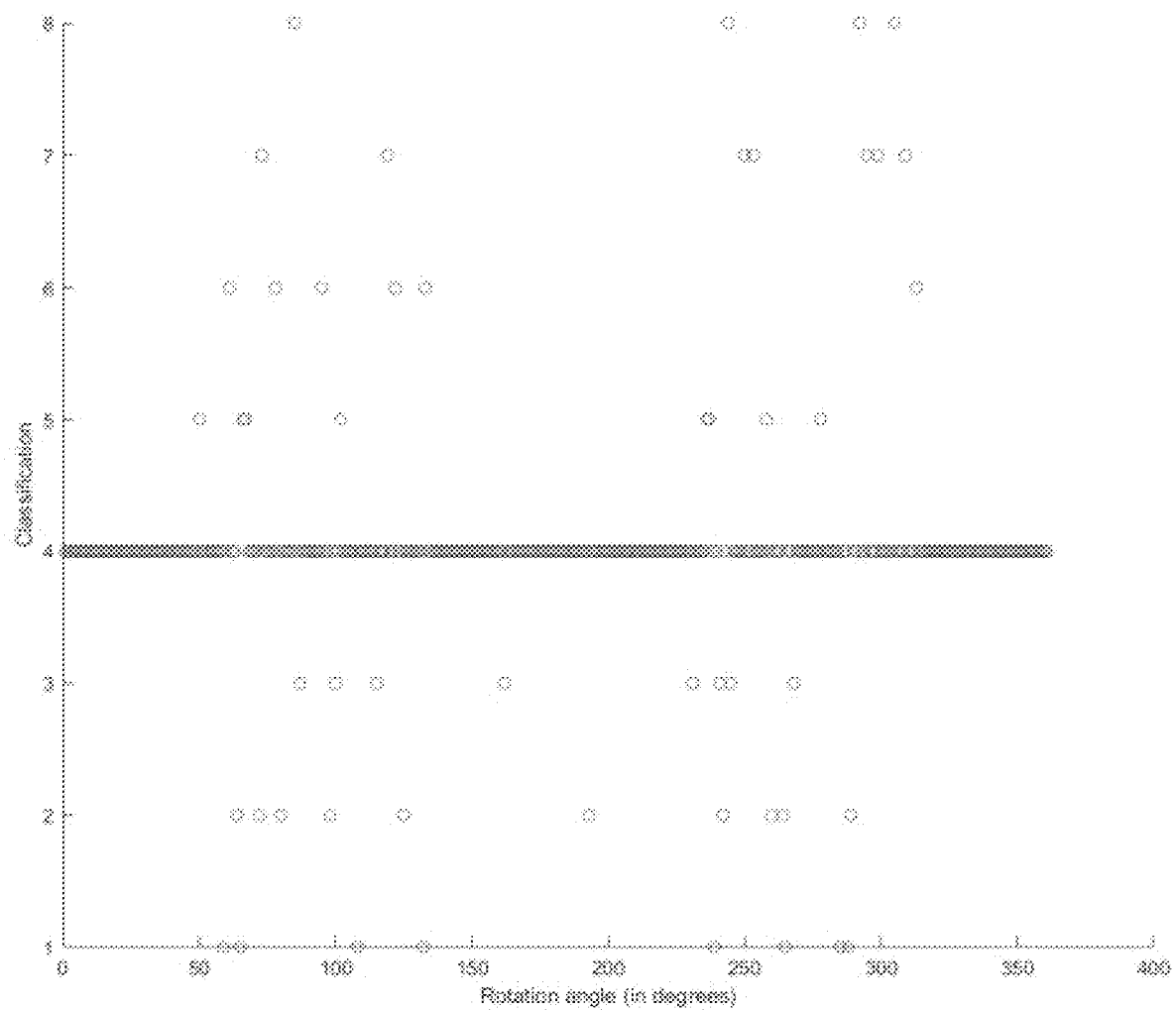
FIG. 12A is a graphical representation of classification versus rotation angle (degrees) plot that shows that for the case ID 4, more than 75% of the rotated images show correct IDs.
Figure 12B:
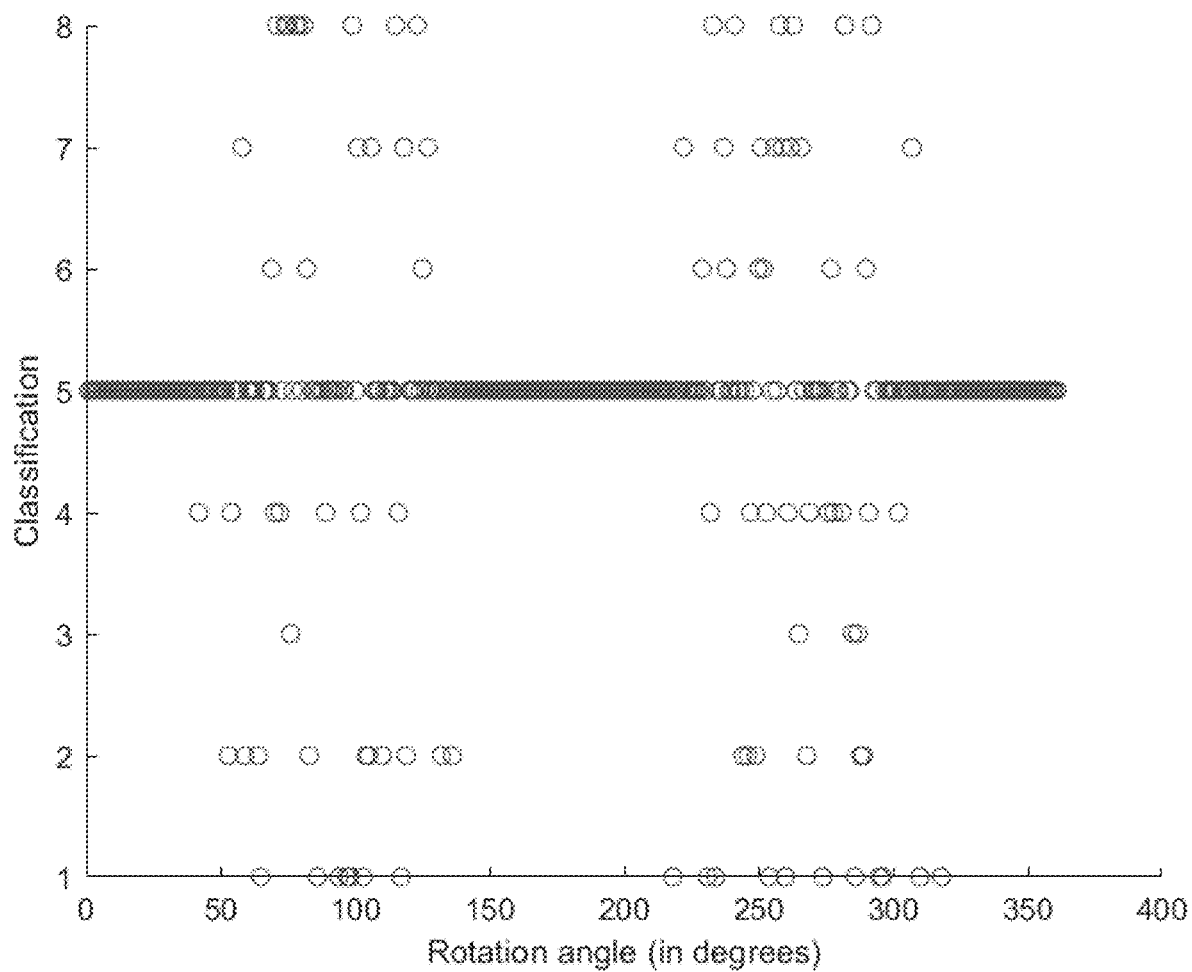
FIG. 12B is a graphical representation of classification versus rotation angle (degrees) plot that shows that for the case ID 5, more than 75% of the rotated images show correct IDs.

FIGS. 12A and 12B show the rotation invariant behavior of the method of the invention for example IDs titled 4 and 5 and that more than 75% of the rotated images showed correct IDs. The greater than 75% reference in the figures as to rotation invariance is only representative of the demonstration study for which the figure data is shown, so that optimization of the use of such natural cork closure imperfections can be obtained for improved accuracy and based on increased database information. FIG. 12A is a classification versus rotation angle (degrees) plot that shows the case ID 4, FIG. 12B is a classification versus rotation angle (degrees) plot that shows the case ID 5. Considering unique IDs for eight images in FIG. 9 as ID 1 to ID8 starting top to bottom and left to right, FIG. 12A shows an example where an input image of ID 4 (shown in FIG. 7B) is rotated by an angle of 1 degree through 360 degrees and compared to the unique IDs 1-8. A similar comparison for rotated images for original image of ID 5 from FIG. 9 is shown in FIG. 12B. The classification versus rotation angle (degrees) shows that for both cases (IDs 4 and 5), more than 75% of the rotated images were classified correctly as ID 4 in FIG. 12A and ID 5 in FIG. 12B, with a currently-used threshold value of 2% and a reduced Fourier space resolution of 16×256 pixels.

Considering unique IDs for eight images in FIG. 9 as ID 1 to ID 8 starting top to bottom and left to right, ID 4 and ID 5 belong to the first two images in the second row of FIG. 9. Rotation angles refer to the angles in degree by which the input image is rotated counterclockwise.

Index and database data are therefore compared by the system and method of the invention so that closure/cork data from a closure prior to installation in a container may be compared to closure/cork data from a closure still installed within and/or at removal from a container. Corresponding matches identify the same or different closure/cork by its signature unique scannable natural imperfection pattern(s).

As will be appreciated, the above method and its many features will have a significant and positive effect on the wine value chain. For cork manufacturers, the present invention creates enhanced cork sales opportunities to their direct consumers, which are the wineries themselves. For retail wine consumers, the added values would be: (1) social media connections to friends based on mutual interests in wines, (2) wine preference prediction and ratings, (3) wine purchasing rewards and incentives, (4) unique wine history and traceability data, (5) wine and cork education opportunities, and (5) more entertaining point-of-sale experiences. For wineries, the added value would be: (1) deeper consumer profile information ("thick data"), (2) large scale consumer trends ("big data"), (3) point-of-sale communication directly to the consumer, and (4) increased customer and brand loyalty.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of tracking a container closure used to seal liquid in a container, the method comprising:
    (a) identifying a trackable indicia of the container closure, wherein the trackable indicia is unique to the container closure and comprises a scannable pattern unique to a material used to construct the container closure and wherein the scannable pattern is based on natural imperfections of the material;
    (b) recording an associated data set comprising a plurality of parameters related to the liquid in the container;
    (c) correlating the associated data set with the trackable indicia;
    (d) applying the container closure to the container to seal the liquid within the container;
    (e) maintaining a database of the trackable indicia corresponding to the associated data set;
    (f) scanning an image of the container closure and its trackable indicia, to create a unique index for the container closure and wherein the scanning is performed prior to applying the container closure to the container, after the container closure is removed from the container, while the container closure is in the container, or a combination thereof, and
    (g) creating a grey-scale image of the scanned image of the trackable indicia and collecting the visible natural imperfections of the material for comparison to other grey-scale images in the database; and
    (h) retrieving and/or transmitting the associated data set from and/or to the database to identify the container closure and the plurality of parameters related to the liquid in the container and to provide a match of data to identify the container closure and/or the plurality of parameters related to the liquid in the container.

2. The method of claim 1, further comprising updating the associated data set by scanning the trackable indicia upon the occurrence of predetermined events, and recording information about the predetermined events to the associated data set.

3. The method of claim 2, wherein the predetermined events may comprise one or more of the following: transfer of possession of the container, removal of the container closure from the container, and consumption of the liquid.

4. The method of claim 1, wherein the plurality of parameters may comprise one or more of the following: liquid production data, qualities of the liquid, conditions present during filling of the container, conditions during aging of the liquid, and geographic data during movement of the container over time.

5. The method of claim 1, wherein the trackable indicia further comprises a bar code.

6. The method of claim 1, wherein the trackable indicia further comprises a QR code.

7. The method of claim 1, wherein the trackable indicia further comprises a unique series of alphanumeric characters.

8. The method of claim 1, wherein the trackable indicia further comprises a radio frequency identification (RFID) tag attached to the container closure.

9. The method of claim 1, wherein the container closure may comprise a natural cork.

10. The method of claim 1, wherein the container closure may comprise a synthetic cork.

11. The method of claim 1, wherein the liquid may comprise an alcoholic beverage.

12. The method of claim 1, wherein the step of scanning is performed using a mobile device wirelessly connected to a global information network.

13. The method of claim 1, wherein the container closure includes a sensing device within the container closure adapted to detect one or more parameters related to the liquid in the container, and further includes a memory adapted to store parameter data.

14. The method of claim 13, wherein the parameters related to the liquid are one or more of the following liquid conditions: age, internal pressure, temperature, oxygen and carbon dioxide levels, and acid concentration.

15. The method of claim 14, wherein the parameter data stored in the memory is transmitted wirelessly to a mobile device and added to the associated data set.

16. A method of tracking and identifying a container closure, the method comprising:

identifying a trackable indicia of the container closure, wherein the trackable indicia is unique to the container closure and comprises a scannable pattern unique to a material used to construct the container closure and wherein the scannable pattern is based on natural imperfections of the material;

scanning an image of the container closure and its trackable indicia, wherein the scanning creates a unique index of index data for the container closure and wherein the scanning is performed prior to applying the container closure in or to the container, after the container closure is removed from the container, while the container closure is in the container, or a combination thereof;

eliminating irrelevant information from the scanned image;

extracting identification data from the scanned image;

creating a grey-scale image of the scanned image of the trackable indicia and collecting the visible natural imperfections of the closure material;

recording an associated data set comprising a plurality of parameters related to the contents of the container, the grey-scale image of the trackable indicia, and the visible natural imperfections of the closure material; and maintaining a database of the trackable indicia corresponding to the associated data set.

17. The method of claim 16, further comprising:

comparing the data of the grey-scale image of the trackable indicia, the index and index data of the container closure, and the data of the visible natural imperfections of the material to other data of grey-scale images, indices, and visible natural imperfections of the material of other container closures in the database;

retrieving and/or transmitting the associated data set from and/or to the database to identify the container closure and the plurality of parameters related to the contents of the container and to provide a match of data to identify the container closure and/or a plurality of parameters related to the contents of the container.

18. The method of claim 16, wherein the trackable indicia is visible and located on the top of the container closure, on one or more sides of the container closure, or a combination thereof.

19. The method of claim 16, wherein the container closure may comprise a cork having naturally-occurring imperfections in the closure material.

20. The method of claim 17, wherein the identifying of a trackable indicia, scanning of an image of the closure and its trackable indicia, creating of a unique index of index data, eliminating of irrelevant information, extracting of identification data, creating of a grey-scale image, collecting of the visible natural imperfections, recording of an associated data set, maintaining of a database of the trackable indicia, comparing of the grey-scale image of the trackable indicia, the index and index data of the closure, and visible natural imperfections of the material, or retrieving and/or transmitting of the associated data set from the database, or a combination thereof, is performed by or using at least one microprocessor-based device and/or a mobile device wirelessly connected to a global information network.

* * * * *